United States Patent [19]

Fujiwara

[11] Patent Number: 4,905,509
[45] Date of Patent: Mar. 6, 1990

[54] HOT WIRE AIR FLOW METER ARRANGEMENT FOR MONITORING INTAKE AIR FLOW RATE IN INTERNAL COMBUSTION ENGINE

[75] Inventor: Koichi Fujiwara, Gunma, Japan

[73] Assignee: Japan Electronic Control Systems Co., Ltd., Isezuki, Japan

[21] Appl. No.: 315,680

[22] Filed: Feb. 27, 1989

[30] Foreign Application Priority Data

Feb. 25, 1988 [JP] Japan ................................ 63-43172

[51] Int. Cl.$^4$ ........................................... G01M 15/00
[52] U.S. Cl. .................................. 73/118.2; 73/204.21
[58] Field of Search ...................... 73/118.2, 204.21; 123/494

[56] References Cited

U.S. PATENT DOCUMENTS

| 4,232,549 | 11/1980 | Migrin et al. | 73/202 |
| 4,478,075 | 10/1984 | Oyama et al. | 73/118.2 |
| 4,612,895 | 9/1986 | Kuroiwa et al. | 123/494 |
| 4,648,270 | 3/1987 | Johnson et al. | 73/202 |

FOREIGN PATENT DOCUMENTS 1318497  5/1973  United Kingdom .

Primary Examiner—Jerry W. Myracle
Attorney, Agent, or Firm—Foley & Lardner, Schwartz, Jeffery, Schwaab, Mack, Blumenthal & Evans

[57] ABSTRACT

A hot wire air flow meter arrangement comprises a primary and an auxiliary air flow path defined in the air induction passage. A hot wire is provided in the primary air flow path for monitoring air flow rate therethrough. A flow restricting means is provided in the auxiliary air flow path for restricting air flow therethrough. The flow restricting means is selectively operative so that it is effective for restricting air flow in a low engine load condition to force the major part of induction air to flow through the primary air flow path and is not effective at high engine load range so as to minimize flow resistance for induction of sufficient amount of air to an internal combustion engine.

11 Claims, 2 Drawing Sheets

4,905,509

HOT WIRE AIR FLOW METER ARRANGEMENT FOR MONITORING INTAKE AIR FLOW RATE IN INTERNAL COMBUSTION ENGINE

BACKGROUND OF THE INVENTION

1. Field of the Invention

The present invention relates generally to an arrangement for monitoring a flow rate of an intake air flowing through an induction system of an internal combustion engine. More specifically, the invention relates to a hot wire flow meter arrangement which can achieve high accuracy in measurement of the intake air flow rate in all engine driving range.

2. Description of Background Art

Hot wire air flow meters, to which the present invention concerns, have already been widely known in the automotive technologies. The hot wire air flow meters are known as advantageous in comparison with the conventionally known flap type air flow meter because of lesser flow resistance against the flow of intake air flowing through an air induction passage.

In general, the hot wire air flow meter comprises an electrically conductive resistor body in a form of a wire, a strip, a tape or so forth. The resistor body is heated at a predetermined reference temperature so as to set its resistance at a reference value. The heated resistor body is placed in the air induction passage to subject air flow. Subjecting air flow, the temperature of the resistor body is lowered in a magnitude corresponding to the air flow rate or air flow velocity through the air induction passage. According to temperature variation, resistance of the resistor body varies holding a known relationship with variation of the temperature of the resistor body. The resistor body is connected to a detector circuit for monitoring variation of the resistance in the resistor body and whereby derives the air flow rate in the air induction passage. The intake air flow rate is used in an engine operation control, such as a fuel injection control, air/fuel ratio control, spark ignition timing control and so forth, as an engine load condition representative parameter.

In such hot wire flow meter, a difficulty is encountered in maintaining satisfactorily high accuracy in substantially low engine load condition. Namely, at substantially low engine load condition, such as that in the engine idling condition, flow velocity of the intake air is substantially low. In the low engine load range, substantially low air flow velocity results in substantially small resistance variation in the extent that the noise component in various source and introduced in the detector circuit may cause substantial influence in deriving the air flow rate. Particularly, in case of high performance engine which has relatively large path area induction system, air flow velocity in the induction system at the low engine load condition becomes smaller to increase difficulty in accurately measuring the intake air flow rate.

In addition, the hot wire flow meter of the conventional construction is also defective at engine full load condition. Namely, when a throttle valve is fully open to provide a maximum intake air flow area for maximum amount of intake air, partial concentration of air flow tends to be caused for lowering the measured intake air flow rate across a value which should be obtained in relation to the actual intake air flow rate. Influence of partial concentration of intake air can be avoided by providing flow restrictive flow regulating member, such as a flow restriction ring, in an orientation upstream of the position of the hot wire. Such arrangement may improve accuracy of measurement of the intake air flow rate. However, the flow restriction may cause degradation of performance of air induction.

SUMMARY OF THE INVENTION

Therefore, it is an object of the present invention to provide a hot wire air flow meter arrangement which can hold high accuracy in measurement of intake air flow rate in all engine driving range.

Another object of the invention is to provide a hot wire air flow meter arrangement which can achieve high accuracy without causing degradation of air induction efficiency.

In order to accomplish aforementioned and other objects, a hot wire air flow meter arrangement, according to the present invention, comprises a primary and an auxiliary air flow path defined in the air induction passage. A hot wire is provided in the primary air flow path for monitoring air flow rate therethrough. A flow restricting means is provided in the auxiliary air flow path for restricting air flow therethrough. The flow restricting means is selectively operative so that it is effective for restricting air flow in a low engine load condition so that major part of induction air flows through the primary air flow path and is not effective at high engine load range so as to minimize flow resistance for induction of sufficient amount of air to an internal combustion engine.

According to one aspect of the invention, a hot wire flow meter arrangement for monitoring an intake air flow rate flowing through an air induction system of an internal combustion engine, comprises:

means for defining a measuring portion where the intake air flow rate is to be measured, in the air induction system;

an electrically conductive resistor body disposed within the measuring portion in such an orientation as to subject air flow through the measuring portion;

an electric circuit connected to the resistor body for supplying a controlled voltage for the resistor body for heating the latter at a predetermined temperature, the electric circuit outputting an output signal representative of the voltage supplied to the resistor body; and means for controlling path area of the measuring portion in such a manner that the path area ofthe measuring portion varies least between a first minimum area and a second maximum area, the path area controlling means being operated to the second position while the engine load is heavier than a predetermined criterion and to the first position while the engine load is smaller than the criterion.

A hot wire air flow meter arrangement may further comprises means for deriving the intake air flow rate on the basis of the output signal of the electric circuit according to a first characteristics when the path area controlling means is placed at the first position and according to a second characteristics when the path area controlling means is placed at the second position.

According to another aspect of the invention, a hot wire flow meter arrangement for monitoring an intake air flow rate flowing through an air induction system of an internal combustion engine, comprises:

means for separating a measuring portion where the intake air flow rate is to be measured, into a first and a second paths;

an electrically conductive resistor body disposed within the first path in such an orientation as to subject air flow through the first path;

an electric circuit connected to the resistor body for supplying a controlled voltage for the resistor body for heating the latter at a predetermined temperature, the electric circuit outputting an output signal representative of the voltage supplied to the resistor body;

means for controlling path area of the second path for restricting air flow passing therethrough;

means for detecting an engine load condition for controlling the path area controlling means at least between a first position in which the second path becomes minimum and a second position in which the second path becomes maximum, the detecting means operating the path area controlling means to the second position while the engine load is heavier than a predetermined criterion and to the first position while the engine load is smaller than the criterion; and means for deriving the intake air flow rate on the basis of the output signal of the electric circuit according to a first characteristics when the path area controlling means is placed at the first position and according to a second characteristics when the path area controlling means is placed at the second position.

The hot wire flow meter arrangement may further comprise means for restricting intake air flowing into the first path for regulating air flow through the first path.

The detecting means detects the engine load condition on the basis of an angular position of a throttle valve disposed in the air induction system; on the basis of an angular position of a throttle valve disposed in the air induction system and an engine revolution speed, or detects the engine load condition on the basis of the output signal of the electric circuit.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
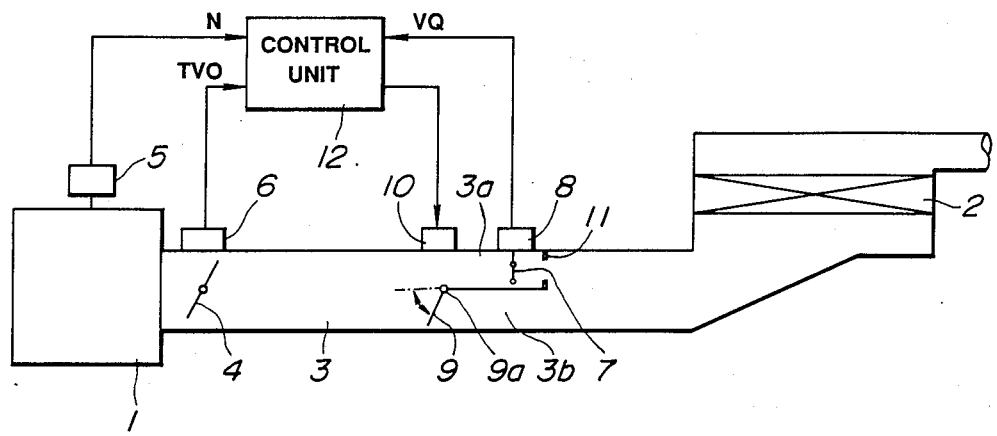
FIG. 1 is a fragmentary diagram of an air induction system for an internal combustion engine, in which the preferred embodiment of a hot wire flow meter, according to the present invention, is employed.

Referring now to the drawings, particularly to FIG. 1, the preferred embodiment of a hot wire flow meter arrangement, according to the present invention, is applied to an air induction system of an internal combustion engine 1. The air induction system includes an air cleaner 2 and an intake duct 3 defining an air intake passge. A throttle valve 4 is disposed within the intake duct 3 for adjusting an intake air amount to introduce the engine 1.

An engine speed sensor 5 is provided for the engine 1 is provided for monitoring a revolution speed N of the engine. The engine speed sensor 5 may comprise a crank angle sensor for monitoring a crankshaft angular position. As is well known, the crank angle sensor produces a crank reference signal produced at every predetermined crankshaft angular position and a crank position signal produced at every given angular displacement. The engine speed can be derived on the basis of an interval of occurrence of the crank reference signal, or, in the alternative, by counting the crank position signal. Manner of deriving the engine speed N based on the crank reference signal or crank position signal is known in the art and thus do not need to discuss in detail. A throttle angle sensor 6, such as a potentiometer, is provided for monitoring angular position the throttle valve 4 to produce a throttle angle indicative signal TVO.

A hot wire 7 is provided in the intake duct 3 at an orientation downstream of the air cleaner 2 and upstream of the throttle valve 4. The hot wire 7 is made of white gold wire, a nickel strip or tape or so forth. The portion of the intake duct 3 where the hot wire 7 is disposed, is partitioned and separated into a primary passage 3a and an auxiliary passage 3b. The hot wire 7 is disposed in the primary air passage 3a for monitoring intake air flow rate flowing through the primary passage. The hot wire 7 is connected to a control circuit 8. The control circuit 8 supplies heating power to the hot wire 7 for maintaining the temperature of the wire at a predetermined temperature. Therefore, the output voltage VQ supplied to the hot wire 7 for maintaining the wire temperature constant is variable depending upon the intake air flow rate of the induction air flowing through the primary passage 3a. The control circuit 8 further outputs the output voltage VQ.

As seen from FIG. 1, a flow restricting annular wall 11 is provided at the upstream end of the primary passage 3a. The flow restricting annular wall 11 is designed so as not to serve for restricting intake air flow in the substantial magnitude and so as to regulate the air flow through the primary passage 3a. This flow restricting annular wall 11 is effective for minimizing pulsation of the intake air flow, which pulsation is caused by variation of intake vacuum in synchronism with the engine revolution. The flow restricting annular wall 11 also serves for preventing error in measurement of the intake air flow rate at the engine full load condition. This is advantageously introduced technology in view of performance of measurement of the intake flow rate near or at the engine full load range.

Figure 5:
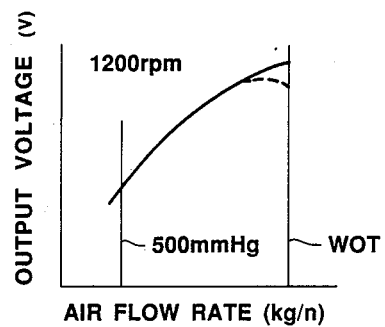
FIG. 5 is a graph showing variation of output voltage of the conventional hot air flow meter and an intake air flow rate at a constant engine speed.

Namely, as shown in FIG. 5, unless the flow restriction is provided at the orientation upstream of the hot wire, the measured intake air flow amount at the engine full load range tends to lower than that actually flowing through the air intake duct. For instance, in the example of FIG. 5, when the engine speed N is maintained constant at 1200 rpm and the pressure in the air intake duct is varied from 500 mmHg to the pressure WOT at the throttle valve fully open position, actually flowing intake air flow rate varies as shown by solid line. Whereas, the air flow rate derived on the basis of the output of the hot wire air flow meter arrangement varies as shown by broken line. According to the shown embodiment, since the flow restricting annular wall 11 serves for providing flow resistance, whereby for compressing the intake at an orientation upstream of the hot wire 7 and subsequently allow expansion to the initial volume, air flow in the primary passage can be regulated. As a result, the measured air flow rate becomes substantially coincide with the actual intake air flow rate.

Figure 2:
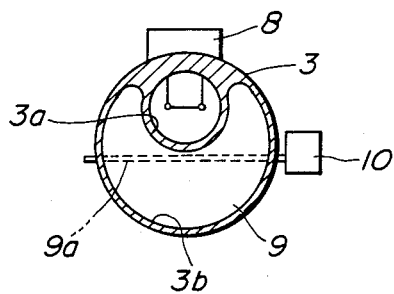
FIG. 2 is a sectional view of the portion of the air induction system, where the preferred embodiment of the hot wire air flow meter is provided.

A butterfly valve 9 is pivotally provided in the partition for pivotal movement at a valve shaft 9a. As seen from FIG. 2, the butterfly valve 9 is fixed to the valve shaft 9a for rotation therewith. The valve shaft 9a extends transversely to the axis of the intake duct 3. One end of the valve shaft 9a is connected to an actuator 10, such as an electric motor, for driving the butterfly valve 9 together with the valve shaft 9a between an open position and a closed position.

The butterfly valve 9 employed in the preferred embodiment of the hot wire air flow meter, according to the invention, will not subject substantial pressure difference between upstream and downstream thereof. Therefore, in the shown embodiment, the butterfly valve 9 may be made of synthetic resin, for example. The resin valve may be advantageous for easy production.

The engine speed sensor 5, the throttle angle sensor 6 and the control circuit 8 are connected to a control unit 12 which may comprise a microprocessor. The control unit 12 processes the output voltage of the control circuit 8 for deriving the intake air flow rate indicative signal. On the other hand, the control unit 8 monitors the throttle valve angular position and the engine speed for deriving the valve position of the butterfly valve 9 so as to selectively close the valve at a predetermined engine load condition as derived based on the throttle valve angular position.

It should be appreciated that the control unit 12 may perform not only derivation of the intake air flow rate and control of the butterfly valve position, but also perform the fuel injection control, spark ignition timing control and so forth.

Operation of the above-mentioned preferred embodiment of the hot wire air flow meter arrangement, according to the invention will be discussed herebelow.

Figure 3:
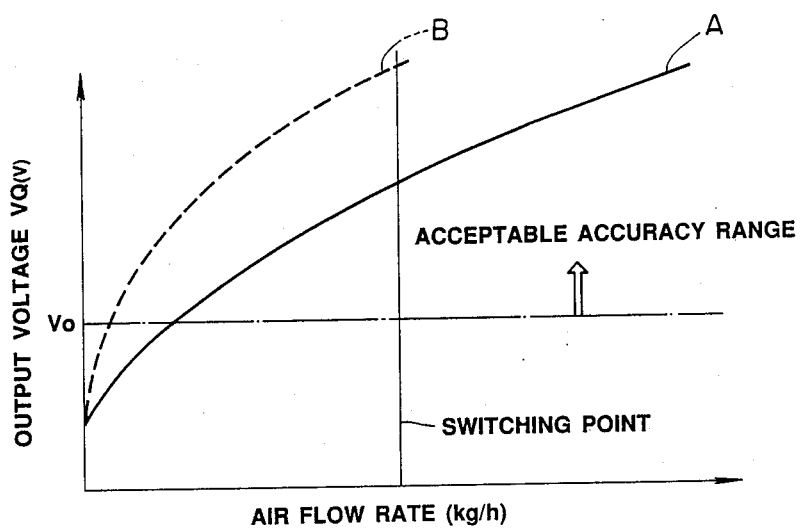
FIG. 3 is a graph showing relationship between an output voltage of the preferred embodiment of the hot wire air flow meter and an intake air flow rate represented by the output voltage.
Figure 4:
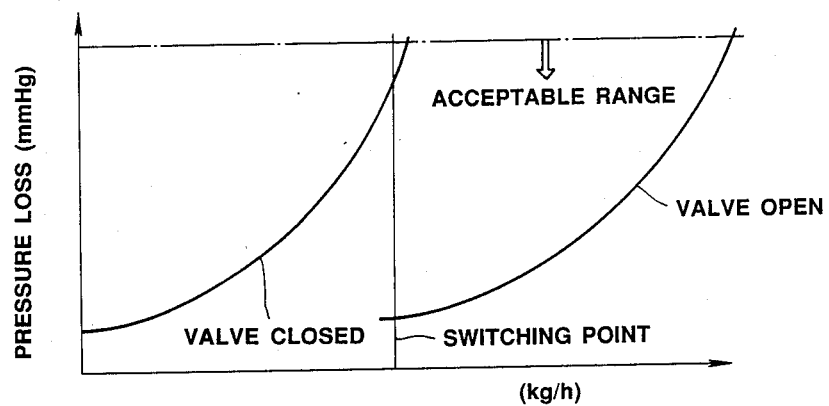
FIG. 4 is a graph showing relationship between a pressure loss and intake air flow rate.

At first, it is assumed that the engine is driven at a relative heavy engine load. At this condition, the control unit 12 controls the actuator 10 so as to maintain the butterfly valve position at a fully open position. At this condition, the intake air past the air cleaner 2 passes both of the primary and auxiliary air passages 3a and 3b for minimizing flow resistance against the intake air. According to the shown embodiment of the hot wire air flow meter arrangement, the pressure loss caused by flow restricting in the hot wire air flow meter arrangement can be maintained within an acceptable range even at the maximum flow rate, as shown in FIG. 4. At this time, the relationship between the intake air flow rate and the output voltage VQ of the control circuit 8 becomes as illustrated by line A in FIG. 3. By setting the output voltage VQ variation in relation to variation of the intake air flow rate in a form of data map or look-up table in a memory (not shown) in the control unit 12, the air flow rate can be easily derived in terms of the output voltage VQ of the control circuit 8.

The control unit 12 checks the engine driving range on the basis of the engine speed N and the throttle valve angular position TVO. The control unit 12 detects the engine driving range to discriminate low engine load range and high engine load range. Namely, when the engine speed is lower than or equal to a predetermined engine speed threshold $N_{ref}$ and the throttle valve open angle is smaller than or equal to a predetermined angle $TVO_{ref}$, the control unit outputs an actuator control signal to operate the latter to place the butterfly valve 9 at the fully closed position. In the alternative, the control unit 12 compares the output voltage VQ of the control circuit 8 with a predetermined threshold voltage $V_0$ which represents a criteria of low engine load range where accuracy in measurement of intake air flow rate can be lowered due to substantially low intake air flow velocity. When the output voltage VQ is lower than or equal to the threshold voltage $V_0$, then the control unit 12 operates the actuator 10 to shift the butterfly valve 10 to the fully closed position.

By positioning the butterfly valve 9 at the fully closed position, the intake air flows only through the primary passage 3a. Therefore, intake air flow velocity is increased. The magnitude of variation of the output voltage VQ of the control circuit 8 in relation to variation of the intake air flow rate in the low engine load range, becomes greater. While the butterfly valve 9 is held at fully closed position, the control unit 12 utilizes a characteristic as illustrated by broken line B in FIG. 3 for deriving the intake air flow rate based on the output voltage VQ. By this, noise which can superimpose on the output voltage will not cause significant influence for the resultant intake air flow rate obtained as a result of measurement.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Though the shown embodiment switches the position of the butterfly valve between the fully open position and closed position, it is possible to vary the butterfly valve position in stepwise fashion or in linear fashion. On the other hand, though the shown embodiment detects the low engine load condition by detecting the engine condition based on the engine speed and the throttle valve angular position or in the alternative based on the output voltage of the control circuit, it may be possible to detect the low engine load condition by means of a mechanical switch associated with the throttle valve to detect the throttle valve open angle smaller than a predetermined angle.

What is claimed is:

1. A hot wire flow meter arrangement for monitoring an intake air flow rate flowing through an air induction system of an internal combustion engine, comprising:
   means for defining a measuring portion where the intake air flow rate is to be measured, in said air induction system;

an electrically conductive resistor body disposed within said measuring portion in such an orientation as to subject air flow through said measuring portion;

an electric circuit connected to said resistor body for supplying a controlled voltage for said resistor body for heating the latter at a predetermined temperature, said electric circuit outputting an output signal representative of the voltage supplied to said resistor body; and means for controlling the path area of said measuring portion in such a manner that the path area of said measuring portion varies at least between a first minimum area and a second maximum area, said path area controlling means being operated to said second position while the engine load is heavier than a predetermined criterion and to said first position while the engine load is smaller than said criterion.

2. A hot wire air flow meter arrangement as set forth in claim 1, which further comprises means for deriving said intake air flow rate on the basis of said output signal of said electric circuit according to a first characteristic when said path area controlling means is placed at the first position and according to a second characteristic when said path area controlling means is placed at the second position.

3. A hot wire flow meter arrangement as set forth in claim 1, which further comprises means for restricting intake air flowing into said first path for regulating air flow through said first path.

4. A hot wire flow meter arrangement as set forth in claim 1, wherein said detecting means detects said engine load condition on the basis of an angular position of a throttle valve disposed in said air induction system.

5. A hot wire flow meter arrangement as set forth in claim 1, wherein said detecting means detects said engine load condition on the basis of an angular position of a throttle valve disposed in said air induction system and an engine revolution speed.

6. A hot wire flow meter arrangement as set forth in claim 1, wherein said detector means detects said engine load condition on the basis of said output signal of said electric circuit.

7. A hot wire flow meter arrangement for monitoring an intake air flow rate flowing through an air induction system of an internal combustion engine, comprising:

means for separating a measuring portion where the intake air flow rate is to be measured, into a first and a second paths;

an electrically conductive resistor body disposed within said first path in such an orientation as to subject air flow through said first path;

an electric circuit connected to said resistor body for supplying a controlled voltage for said resistor body for heating the latter at a predetermined temperature, said electric circuit outputting an output signal representative of the voltage supplied to said resistor body;

means for controlling path area of said second path for restricting air flow passing therethrough;

means for detecting an engine load condition for controlling said path area controlling means at least between a first position in which said second path becomes minimum and a second position in which said second path becomes maximum, said detecting means operating said path area controlling means to said second position while the engine load is heavier than a predetermined criterion and to said first position while the engine load is smaller than said criterion; and means for deriving said intake air flow rate on the basis of said output signal of said electric circuit according to a first characteristic when said path area controlling means is placed at the first position and according to a second characteristic when said path area controlling means is placed at the second position.

8. A hot wire flow meter arrangement as set forth in claim 7, which further comprises means for restricting intake air flowing into said first path for regulating air flow through said first path.

9. A hot wire flow meter arrangement as set forth in claim 7, wherein said detecting means detects said engine load condition on the basis of an angular position of a throttle valve disposed in said air induction system.

10. A hot wire flow meter arrangement as set forth in claim 7, wherein said detecting means detects said engine load condition on the basis of an angular position of a throttle valve disposed in said air induction system and an engine revolution speed.

11. A hot wire flow meter arrangement as set forth in claim 7, wherein said detector means detects said engine load condition on the basis of said output signal of said electric circuit.

* * * * *